United States Patent [19]

Inoue et al.

[11] Patent Number: 5,175,622
[45] Date of Patent: Dec. 29, 1992

[54] APPARATUS AND METHOD FOR GENERATING SPECIAL EFFECTS BY PROCESSING VIDEO SIGNALS FROM THREE SOURCES

[75] Inventors: Kiyoshi Inoue; Tsutomu Takamori; Ichiro Ninomiya, all of Kanagawa, Japan

[73] Assignee: Sony Corporation, Tokyo, Japan

[21] Appl. No.: 757,208

[22] Filed: Sep. 10, 1991

[30] Foreign Application Priority Data

Sep. 20, 1990 [JP] Japan .................. 2-251345

[51] Int. Cl.⁵ ............... H04N 5/272; H04N 5/265
[52] U.S. Cl. ................. 358/183; 340/721; 340/725
[58] Field of Search ........... 358/183, 182, 22; 382/47; 340/721, 724, 725

[56] References Cited

U.S. PATENT DOCUMENTS

| | | | |
|---|---|---|---|
| 4,266,242 | 5/1981 | McCoy | 358/22 |
| 4,360,831 | 11/1982 | Kellar | 340/721 |
| 4,409,618 | 10/1983 | Inaba et al. | 358/183 |
| 4,707,742 | 11/1987 | Field et al. | 358/22 |
| 4,727,365 | 2/1988 | Bunker et al. | 340/723 |
| 4,814,884 | 3/1989 | Johnson et al. | 358/183 |
| 4,831,445 | 5/1989 | Kawabe | 358/22 |
| 4,876,600 | 10/1989 | Pietzsch et al. | 358/22 |
| 4,965,844 | 10/1990 | Oka et al. | 358/22 |
| 5,046,165 | 9/1991 | Pearman et al. | 358/22 |
| 5,053,760 | 10/1991 | Frasier et al. | 340/725 |

FOREIGN PATENT DOCUMENTS 0344976 12/1989 European Pat. Off. .
0205673 8/1989 Japan .
0152373 6/1990 Japan .

Primary Examiner—James J. Groody
Assistant Examiner—Jeffrey S. Murrell
Attorney, Agent, or Firm—Alvin Sinderbrand; William S. Frommer

[57] ABSTRACT

A special effect generating system processes first, second, and third video signals supplied respectively from first, second, and third video signal sources to produce an output video signal with special effects. At a plurality of points of time along a first time base, first control data indicative of positions of edges of a first image represented by the first video signal are generated and stored in a first memory. At a plurality of points of time along a second time base, second control data indicative of positions of a boundary between second and third images represented by the second and third video signals are generated and stored in a second memory. The first, second, and third video signals are combined into the output video signal based on the first and second control data stored in the first and second memories.

2 Claims, 4 Drawing Sheets

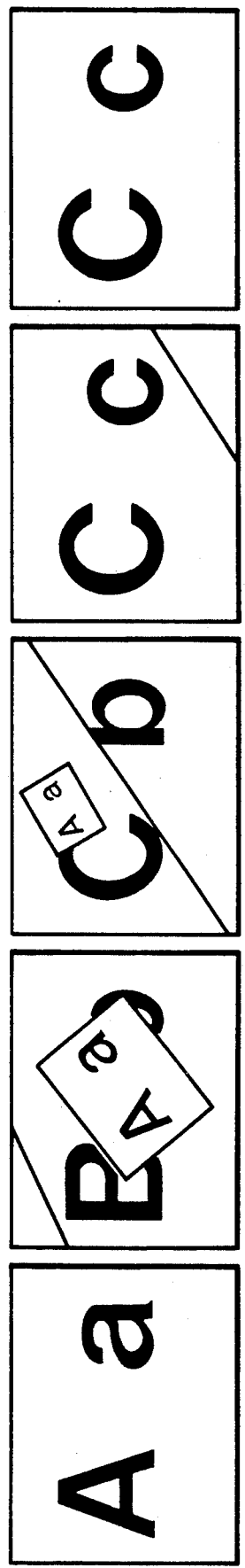

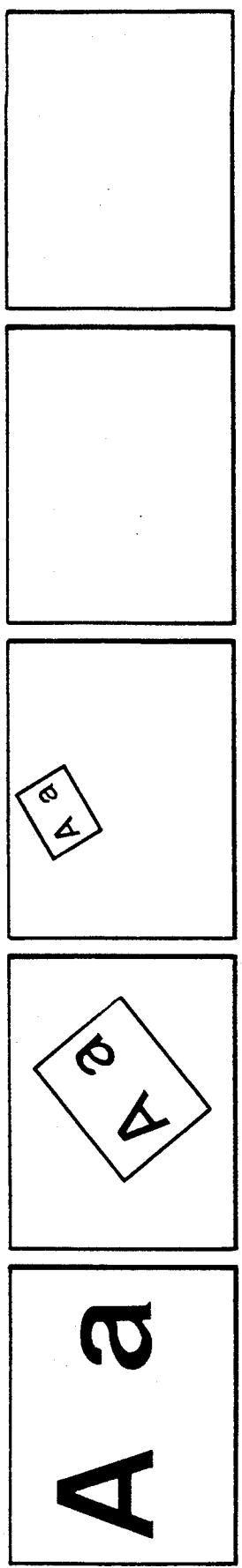
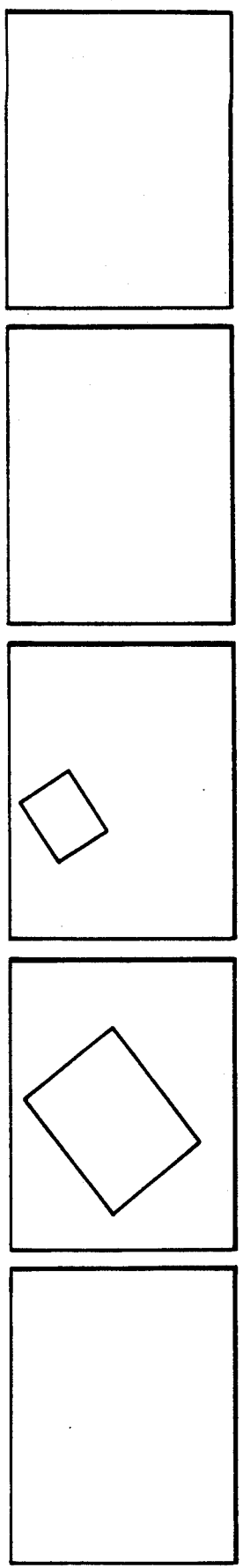
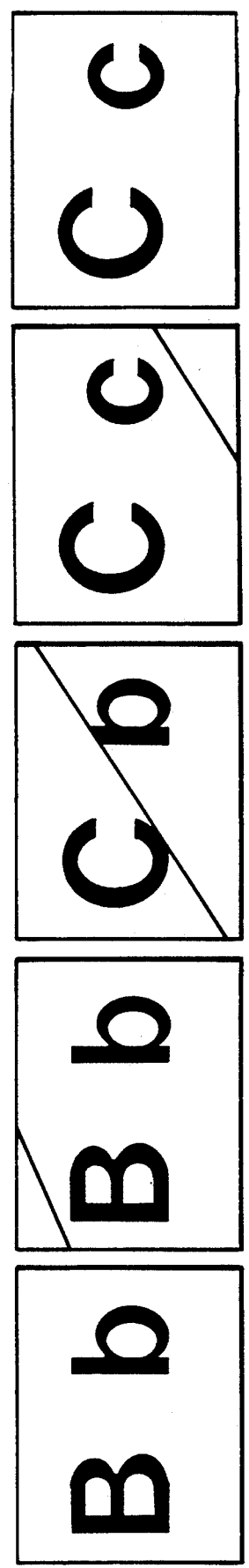

APPARATUS AND METHOD FOR GENERATING SPECIAL EFFECTS BY PROCESSING VIDEO SIGNALS FROM THREE SOURCES

BACKGROUND OF THE INVENTION

1. Field of the Invention

The present invention relates to a special effect generating system for processing video signals to generate special visual effects to be displayed, and more particularly to a special effect generating system for processing a plurality of video signals supplied from a plurality of video signal sources to generate special visual effects to be displayed.

2. Description of the Prior Art

There is known an electronic editing system which comprises a plurality of video tape recorders, an edit controller, a switcher, and an image converter. After a plurality of video signals reproduced by the respective tape recorders are processed for special effects, the processed video signals are electronically edited, and recorded on another video tape recorder.

As disclosed in Japanese Laid-Open Patent Publication No. 56-62485, for example, the switcher is capable of effecting on the video display screen a transition from an image represented by one video signal to an image represented by another video signal, the new image gradually appearing from one side or corner of the old image. The scene transition is one form of special effect called "wipe."

As disclosed in U.S. Pat. No. 4,965,844, the image converter employs a digital memory, and progressively enlarges or reduces an image represented by a video signal while at the same time progressively shifting the position of the image on a reference screen (i.e., the screen of a television receiver).

The edit controller serves to control the tape transport in the video tape recorders for reproducing video signals and the video tape recorder for recording the edited video signal, and the timing of recording and reproducing the video signals.

In the conventional electronic editing system that incorporates such a special effect generating system, since the switcher and the image converter operate independently of each other, it has been difficult to effect adequate image processing based on a combination of image wipe, image deformation, and image movement.

OBJECTS AND SUMMARY OF THE INVENTION

It is an object of the present invention to provide a special effect generating system which is capable of simply and easily carrying out special effects in the form of a combination of image wipe, image deformation, and image movement.

In accordance with the present invention, there is provided a special effect generating system for processing first, second, and third video signals supplied respectively from first, second, and third video signal sources comprising first control data generating means, for generating, first control data indicative of positions of edges of a first image represented by the first video signal, second control data generating means, at a plurality of points along a first time base and including first memory means for storing the first control data of positions of a boundary between second and third images represented by the second and third video for generating second control data indicative, and including second memory means for storing the second control data, and signal combining means for processing the first, second, and third video signals based on the first and second control data stored in the first and second memory means, to produce an output video signal.

The above and other objects, features, and advantages of the present invention will become apparent from the following description of an illustrative embodiment thereof to be read in conjunction with the accompanying drawings, in which like reference numerals represent the same or similar objects.

BRIEF DESCRIPTION OF THE DRAWINGS

FIGS. 2a through 2e are views illustrative of images represented by an output video signal of the special effect generating system shown in FIG. 1;

FIGS. 3a through 3o are views illustrative of images represented by intermediate video signals of the special effect generating system shown in FIG. 1.

DETAILED DESCRIPTION OF THE PREFERRED EMBODIMENT

Figure 1:
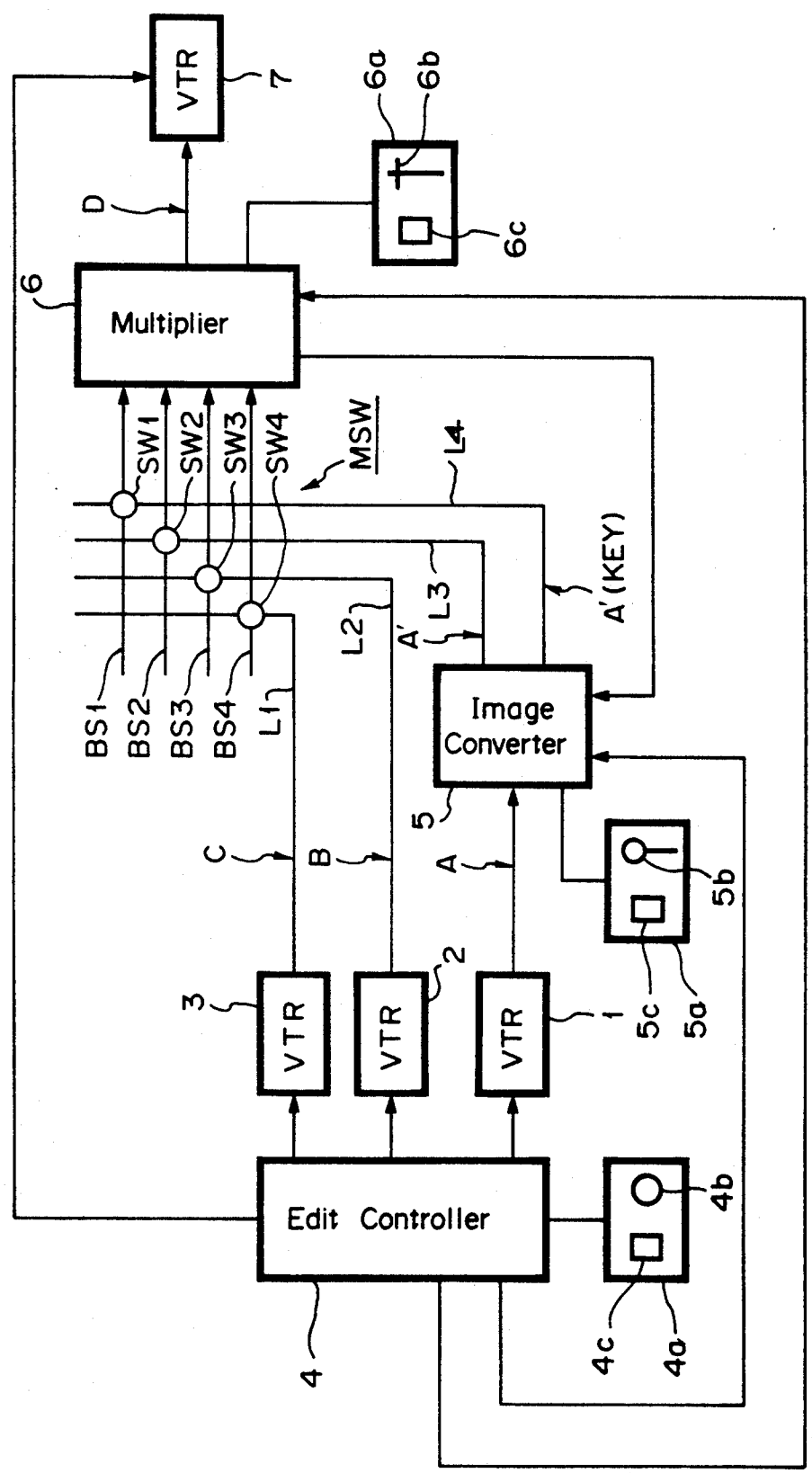
FIG. 1 is a block diagram of a special effect generating system according to the present invention.

FIG. 1 shows in block form a special effect generating system according to the present invention. In FIG. 1, the special effect generating system is connected to video tape recorders (VTRs) 1, 2, 3 for reproducing recorded video signals and a video tape recorder (VTR) 7 for recording a video signal. Each of these video tape recorders 1, 2, 3, 7 is of the helical scan type. At least one of the video tape recorders 1, 2, 3, 7 may be replaced with a video disc recorder or player.

The special effect generating system includes an edit controller 4 for controlling tape transport, operation modes, and timing of recording and reproducing video signals in the video tape recorders 1, 2, 3, 7. The edit controller 4 has a control panel 4a equipped with a jog dial 4b, a display unit (display monitor) 4c, and various control switches (not shown). Reproduced video signals from the video tape recorders 1, 2, 3 and a composite video signal from a multiplier 6 (described later on) are selectively supplied to the display unit 4c for display. The edit controller 4 may be an independent device or may be incorporated in the video tape recorder 7.

The special effect generating system also includes an image converter 5 having a control panel 5a. The control panel 5a has a joystick 5b, a display unit (display monitor) 5c, and various control switches (not shown).

The multiplier 6 has a control panel 6a that is equipped with a fader lever 6b, a display unit (display monitor) 6c, and various control switches (not shown). The multiplier 6 has input terminals connected to four bus lines BS1, BS2, BS3, BS4 that are connected to four signal lines L1, L2, L3, L4. A matrix switch MSW composed of 16 on/off switches is connected between the bus lines BS1, BS2, BS3, BS4 and the signal lines L1, L2, L3, L4, with the on/off switches disposed respective at the points of intersection of the bus lines BS1, BS2, BS3, BS4 and the signal lines L1, L2, L3, L4. When four on/off switches SW1, SW2, SW3, SW4 of the matrix switch MSW are turned on, video signals from the signal lines L4, L3, L2, L1 are supplied over the respective bus lines BS1, BS2, BS3, BS4 to the multiplier 6 in which the video signals are multiplied. The two video signals supplied to the bus lines BS3, BS4 are turned on and off by the corresponding on/off switches such that a transition is effected from one side (left side) or one corner (upper left corner) of the image represented by one of the video signals to the image represented by the other video signal. The multiplier 6 supplies a composite video signal (composite color video signal) to the video tape recorder 7 which records it on a magnetic tape (not shown) along inclined tracks thereon. The composite video signal is also supplied to the edit controller 4 so that it is displayed on the display unit 4c. The composite video signal is also displayed on the display unit 6c of the multiplier 6.

The reproduced video signal A from the video tape recorder 1 is supplied to the image converter 5 whose output video signals A', A'(KEY) are supplied to the signal lines L3, L4, respectively. The reproduced video signals B, C from the video tape recorders 2, 3 are supplied to the signal lines L2, L1, respectively.

The image converter 5 and the multiplier 6 are controlled by the edit controller 4. The image converter 5 is also controlled by the multiplier 6.

Operation of the special effect generating system shown in FIG. 1 will be described below with reference to FIGS. 2a through 2e, 3a through 3o, and 4A through 4C. In the image converter 5, the reproduced video signal A, which is displayed on the display unit 5c as shown in FIG. 3a), from the video tape recorder 1 is supplied to a memory (digital memory). The image converter 5 generates a video signal, depending on the position of the joystick 5b operated on by the operator, according to which the size of the image displayed on the display unit 5c is progressively reduced until the image finally disappears, and, at the same time, the position of the displayed image changes on the display unit 5c, with the image surrounded by a black background. The image converter stores generated successive frames of video signals, which represent video images, as shown in FIGS. 3a through 3e, of desired sizes and at desired positions, in the memory at a plurality points of time X1, X2, X3, X4, X5 along a time base t shown in FIG. 4A.

Thereafter, an actual editing process is initiated. The operator operates the joystick 5b to cause the image converter 5 to read video signals from the memory at a plurality points of time t1, t2, t3, t4, t5 along the time base t shown in FIG. 4A, and interpolate image data between the read video images, thereby producing a video signal A' according to which the size of the displayed image is progressively reduced until the image finally disappears, and, at the same time, the position of the displayed image changes.

At the same time, the image converter 5 generates a key signal A' (KEY) indicative of the position of video signal A' thus generated. The position of the edges of the key signal A' key varies with the position and size of the video signal A', as shown in FIGS. 3f through 3j.

Rather than directly storing, in the memory, the signals that are of desired sizes and at desired positions at the points of time X1, X2, X3, X4, X5 along the time base t, the image converter 5 may store, in its memory, data indicative of positions of the joystick 5b corresponding to the video signals, and data indicative of positions of edges of the video signals, and also may edit the video signals by converting them based on the stored data, for thereby generating the video signal A'.

With respect to the reproduced video signals B, C from the video tape recorders 2, 3, when the fader lever 6b is operated by the operator, the multiplier 6 alternately outputs the reproduced video signals B, C such that a transition occurs from the image represented by the reproduced video signal B to the image represented by the reproduced video signal C as a boundary line between the images is translated diagonally across the screen of the display unit 6c from its upper left corner, as shown in FIGS. 3k through 3o. The multiplier 6 stores in its memory data indicative of the positions of the fader lever 6b at which the images shown in FIGS. 3k through 3o change at respective points of time $\tau1, \tau2, \tau3, \tau4, \tau5$ along a time base $\tau$ shown in FIG. 4B. In an editing process, the multiplier 6 reads the data indicative of the positions of the fader lever 6b from the memory, and selectively outputs the video signals B, C based on the read data, thus producing composite video signals Y1, Y2, Y3, Y4, Y5 at the respective points of time $\tau1, \tau2, \tau3, \tau4, \tau5$ along the time base $\tau$.

Based on the speed of rotation and the angular displacement of the jog dial 4b operated on by the operator, the edit controller 4 controls operation of the video tape recorders 1, 2, 3 to reproduce video signals in an ordinary playback mode, a slow playback mode, or a still playback mode. The reproduced images are displayed on the display unit 4c.

At the same time, the edit controller 4 also controls operation of the image converter 5 and the multiplier 6 based on the video signals stored at the various points of time along the time base t, and the time base t respectively or the data indicating the positions of the joystick 5b and the edges of the video signals, and the data indicating the positions of the fader lever 6b, respectively.

More specifically, the image converter 5 supplies the multiplier 6 with the video signal A' which represent images that vary as shown in FIGS. 3a through 3e, and the key signal A'(KEY) whose edges change as shown in FIGS. 3f through 3j, over the signal lines L3, L4, the switches SW2, SW1, and the bus lines BS2, BS1. The multiplier 6 then combines the video signal A' and the key signal A' (KEY) with the composite signals based on the video signals B, C which represent images that vary as shown in FIGS. 3f through 3j, over the signal lines L3, L4, the switches SW2, SW1, and the bus lines BS2, BS1. The multiplier 6 now outputs a composite video signal (special effect video signal) D which represents images that vary, as shown in FIGS. 2a through 2e, at a plurality of points of time T1, T2, T3, T4, T5 along a time base T shown in FIG. 4C, and supplies the composite video signal D to the video tape recorder 7. The supplied composite video signal D is recorded on the magnetic tape along inclined tracks thereon in the video tape recorder 7. The composite video signal D is also supplied to the edit controller 4 for display on the display unit 4c.

Figure 4A:
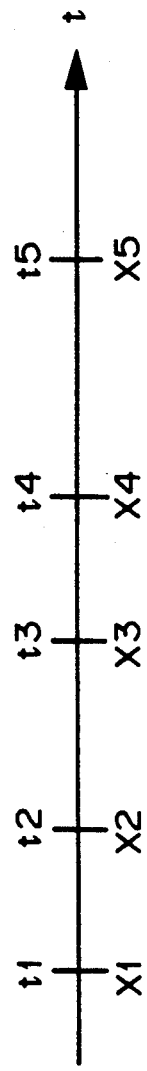
FIGS. 4A through 4C are diagrams showing various points of time at which various video signals are generated in the special effect generating system shown in FIG. 1.
Figure 4B:
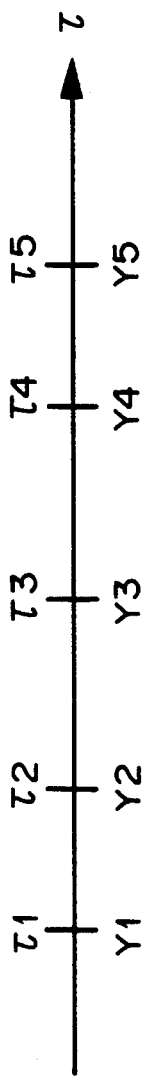
Figure 4C:
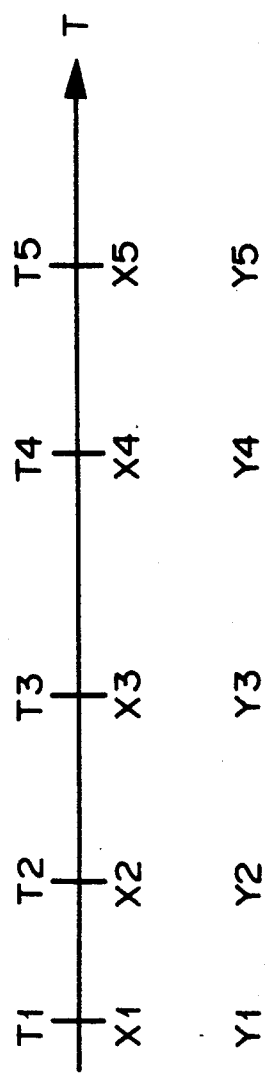

The time bases t, $\tau$, T shown in FIGS. 4A, 4B, 4C, respectively, are independent of each other, and the various points of time along the time bases t, $\tau$, T are selected as desired.

The image converter 5 may be controlled by the fader lever 6b of the multiplier 6, and the video signal A' may be displayed on the display unit 6c of the multiplier 6.

The multiplier 6 may be controlled by the joy-stick 5b of the image converter 5, and the composite video signals based on the video signals B, C may be displayed on the display unit 5c of the image converter 5.

The special effect generating system according to the present invention can therefore process a plurality of video signals to produce special effects based on a combination of image wipe, image deformation, and image movement through a simple and easy editing process.

Having described a preferred embodiment of the invention respectively with reference to the accompanying drawings, it is to be understood that the invention is not limited to that precise embodiment and the described modifications and that various changes and modifications could be effected by one skilled in the art without departing from the spirit or scope of the invention as defined in the appended claims.

What is claimed is:

1. A special effect generating system for processing first, second, and third video signals supplied respectively from first, second, and third video signal sources, comprising:

first memory means for storing frames of the first video signal at a plurality of points along a first time base;

control data generating means for generating control data indicative of positions of a boundary between second and third images represented by the second and third video signals at a plurality of points along a second time base, and including second memory means for storing the control data;

image converting means for generating interpolated data between the frames stored in said first memory means to produce a fourth video signal, and including key signal generating means for generating a key signal based on said fourth video signal;

means for selectively outputting said second and third video signals as a controlled video signal based on the control data stored in said second memory means; and combining means for combining said controlled signal and said fourth video signal based on said key signal to produce an output video signal.

2. A method of generating special effects by processing first, second, and third video signals, comprising the steps of:

defining edge data of a first image represented by the first video signal at a first plurality of points of time along a first time base;

defining boundary data between a second image represented by the second video signal and a third image represented by the third video signal at a second plurality of points of time along a second time base;

deforming said first image into a fourth image represented by a fourth video signal based on the defined edge data of the first image at said first plurality of points of time;

generating a key signal corresponding to said fourth video signal;

combining the second and third video signals into a fifth video signal representing a fifth image, based on the defined boundary data at said second plurality of points of time; and combining said fourth and fifth video signals based on said key signal.

* * * * *